United States Patent
Ou et al.

(10) Patent No.: US 11,928,416 B2
(45) Date of Patent: *Mar. 12, 2024

(54) SEMICONDUCTOR PROCESS TECHNOLOGY ASSESSMENT

(71) Applicant: Taiwan Semiconductor Manufacturing Company, Ltd., Hsinchu (TW)

(72) Inventors: Hung-Chih Ou, Kaohsiung (TW); Kuo-Fu Lee, Hsinchu County (TW); Wen-Hao Chen, Hsinchu (TW); Keh-Jeng Chang, Hsinchu (TW); Hsiang-Ho Chang, Miaoli County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,701

(22) Filed: Mar. 1, 2023

(65) Prior Publication Data

US 2023/0205974 A1 Jun. 29, 2023

Related U.S. Application Data

(63) Continuation of application No. 17/231,194, filed on Apr. 15, 2021, now Pat. No. 11,604,915.

(51) Int. Cl.
*G06F 30/398* (2020.01)
*G06F 119/18* (2020.01)

(52) U.S. Cl.
CPC ........ *G06F 30/398* (2020.01); *G06F 2119/18* (2020.01)

(58) Field of Classification Search
CPC ...... G06F 30/392; G06F 30/398; G06F 30/39; G06F 30/394; G06F 2119/18; G06F 1/3287; G06F 2111/14; G06F 2113/18; G06F 30/3953; G06F 1/3296; G06F 21/32; G06F 2221/2113; G06F 3/167; G06F 30/20; G06F 30/367; G06F 1/10; G06F 1/32; G06F 2115/06; G06F 2117/12; G06F 2119/06; G06F 30/327; G06F 30/36; G03F 1/36;
(Continued)

(56) References Cited

U.S. PATENT DOCUMENTS

8,818,785 B2* 8/2014 Goo ...................... G06F 30/367
703/14
10,223,483 B1 3/2019 Tan et al.
(Continued)

*Primary Examiner* — Binh C Tat
(74) *Attorney, Agent, or Firm* — MERCHANT & GOULD P.C.

(57) ABSTRACT

A method of process technology assessment is provided. The method includes: defining a scope of the process technology assessment, the scope comprising an original process technology and a first process technology; modeling a first object in an integrated circuit into a resistance domain and a capacitance domain; generating a first resistance scaling factor and a first capacitance scaling factor based on the modeling, the original process technology, and the first process technology; and utilizing, by an electronic design automation (EDA) tool, the first resistance scaling factor and the first capacitance scaling factor for simulation of the integrated circuit.

20 Claims, 9 Drawing Sheets

(58) Field of Classification Search
CPC ..... G03F 1/70; G03F 1/20; G03F 1/26; G03F 1/30; G03F 1/32; H01L 27/0207; H01L 23/528; H01L 23/49838; H01L 2225/06544; H01L 2924/13091; H01L 23/485; H01L 21/82385; H01L 29/94; H01L 27/0688; H01L 25/0657
USPC .................................. 716/100–106, 136–139
See application file for complete search history.

(56) References Cited

U.S. PATENT DOCUMENTS

| | | | |
|---|---|---|---|
| 11,604,915 B2* | 3/2023 | Ou | ................. G06F 30/398 |
| 2015/0205905 A1* | 7/2015 | Ho | ................. G06F 30/20 |
| | | | 716/52 |
| 2018/0301185 A1 | 10/2018 | Lin et al. | |

* cited by examiner

| Index 1 | Res. | Cap. |
|---------|------|------|
| Item 1  | 10   | 5    |
| Item 2  | 15   | 0.1  |
| ...     | ...  | ...  |

FIG. 2A

| Index 1 | Scaling Factor 1 | Scaling Factor 2 |
|---|---|---|
| Item 1 | 1.0 | 0.98 |
| Item 2 | 1.5 | 0.77 |
| ... | ... | ... |

FIG. 2B

| Index 1 | Res. | Cap. | Scaling Factor 1 | Scaling Factor 2 |
|---------|------|------|------------------|------------------|
| Item 1  | 10   | 5    | 1.0              | 0.98             |
| Item 2  | 15   | 0.1  | 1.5              | 0.77             |
| ...     | ...  | ...  | ...              | ...              |

| Index | Width | Spacing1 | Spacing2 | Scaling Factor 1 | Scaling Factor 2 |
|---|---|---|---|---|---|
| Res/1 | A | 1*A | 1*A | 1.03 | 1.05 |
| Res/2 | A | 3*A | 3*A | 1.55 | 1.57 |
| Res/3 | A | 1*A | 3*A | 1.43 | 1.46 |
| Cap/1 | A | 1*A | 1*A | 0.93 | 0.95 |
| Cap/2 | A | 3*A | 3*A | 0.58 | 0.61 |
| Cap/3 | A | 1*A | 3*A | 0.77 | 0.79 |

SEMICONDUCTOR PROCESS TECHNOLOGY ASSESSMENT

CROSS-REFERENCE

This application is a continuation of U.S. patent application Ser. No. 17/231,194 filed Apr. 15, 2021, which is now U.S. Pat. No. 11,604,915 dated Mar. 14, 2023, which is hereby incorporated in its entirety.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the mainstream course of IC evolution, functional density (i.e., the number of interconnected devices per chip area) has generally increased while geometry size (i.e., the smallest component that can be created using a fabrication process) has decreased. However, this mainstream evolution needs to follow the Moore's rule by a huge investment in facility establishment. Therefore, it has been a constant need to develop ICs with smaller chip areas, lower costs, and a shorter turn-around-time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Semiconductor devices may be fabricated according to a process. A semiconductor fabrication process requires substantial physical foundry infrastructure committed to a fabrication task for a lengthy period of time. Changes to such a process may require expensive reconfiguration of foundry infrastructure and if a change to a process fails to achieve desired results, such failure may not be apparent until after a significant outlay of time and resources. Thus, analysis techniques are employed to identify negative impacts of a process change before such a change is physically implemented. Given the enormous number of variables necessary to accurately model a modern semiconductor device formed of a fabrication process, analysis techniques themselves can require many weeks to perform.

In advanced technology nodes (e.g., N10, N7, N5), a variety of process technologies can be adopted and applied. However, the performance of different combinations of process technologies may vary, also depending on products of customers. As a result, technology assessment is important for both integrated circuit (IC) foundries and their customers like fabless semiconductor companies. Technology assessment often needs a long turn-around-time, from defining the scope at the beginning to concluding with results in the end. Technology assessment often requires a lot of skilled engineers to derive models of process targets and generate required technology files. For instance, it could take ten teams of skilled engineers about more than one month to get the job done.

Specifically, technology assessment may be triggered by multiple factors. It may be triggered by both IC foundries and their customers for exploring the possibility of technology changes and the impact thereof. In a non-limiting example, technology assessment may be triggered by design rule changes such as changes in spacing and enclosure rules on metal layers and vertical interconnect access (via) layers which will impact the final power, performance, and area (PPA) of designs. PPA includes those three variables used in deciding how to optimize semiconductor designs. In another non-limiting example, technology assessment may be triggered by metal scheme changes in the back end of line (BEOL). More metal layers and via layers may provide more back-end resources and may also increase overall costs. Thus, when metal scheme changes in BEOL occur, it is desirable to minimize the overall costs while keeping similar PPA.

In accordance with some embodiments, a fast process technology assessment method is provided. The method could shorten the turn-around-time of the technology assessment by adopting selective resistance-capacitance (RC) scaling techniques. There is no need to derive physical target from process research and development (R&D) team. No process model based on an analog electronic circuit simulator (e.g., SPICE) is required for the modeling team. No real technology file is generated from the RC analysis team. As such, the turn-around-time can be reduced from more than one month to several days by applying the method.

Figure 1A:
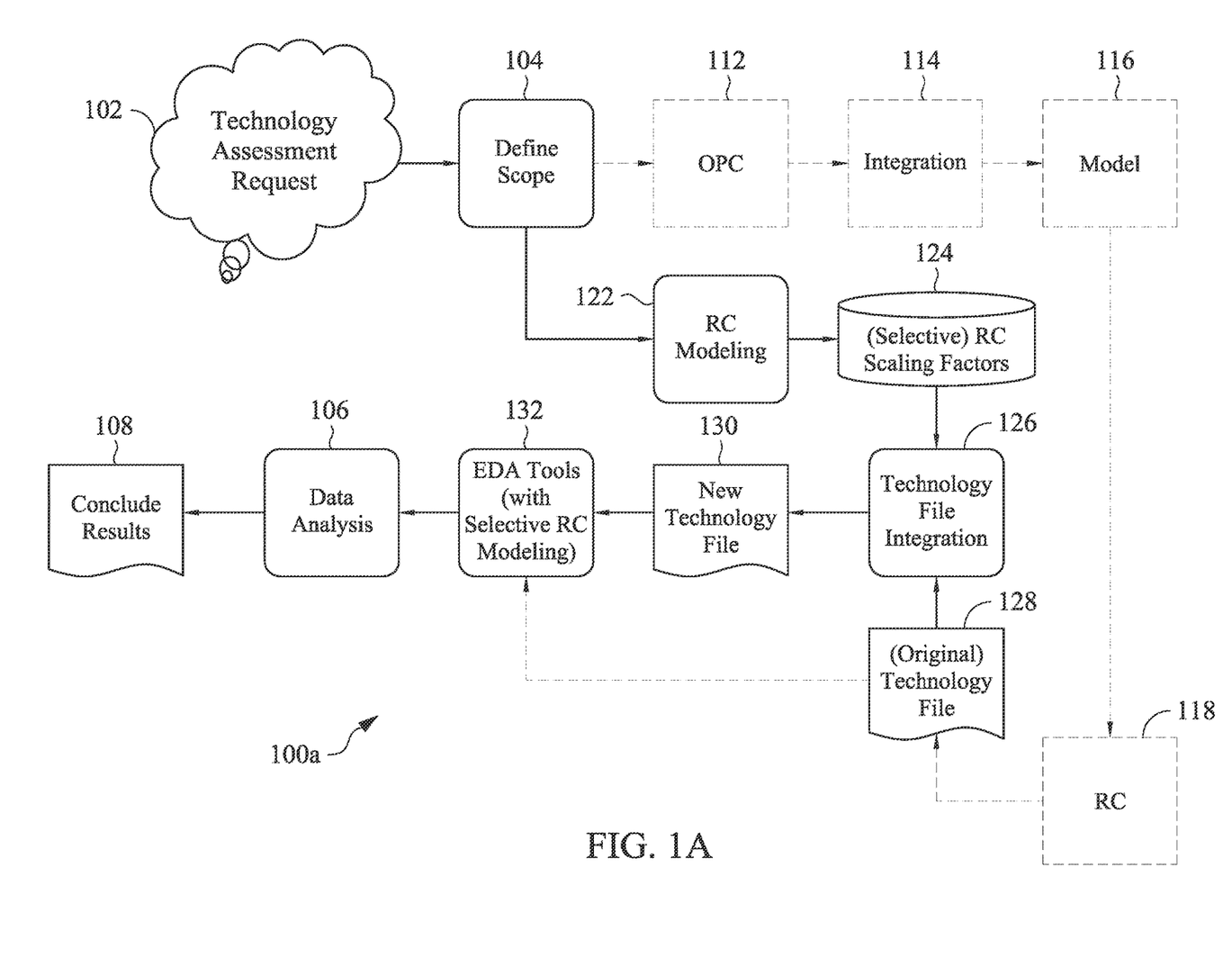
FIG. 1A is a flowchart diagram illustrating a method of fast process technology assessment in accordance with some embodiments.

FIG. 1A is a flowchart diagram illustrating a method 100a of fast process technology assessment in accordance with some embodiments. In general, by adopting selective RC scaling techniques, the method 100a can avoid several conventional steps 112, 114, 116, and 118 shown in dash lines, therefore reducing the turn-around-time of the process technology assessment.

The method 100a starts at step 102 where a process technology assessment request is provided. The technology assessment request is provided by either IC foundries or their customers such as fabless semiconductor companies. At step 104, a scope of the process technology assessment is defined. The scope of the process technology assessment includes an original process technology and a new process technology. In other words, the new process technology is assessed in view of the original process technology (i.e., assessing changes in process technology). The scope of the process technology assessment may be defined based on the process technology assessment request provided at step 102. In one non-limiting example, the scope of the process technology assessment is assessing the impacts of changing the pitch and width of the first metal layer (M1 layer) of an IC. In another non-limiting example, the scope of the process technology assessment is assessing the impacts of adding several metal layers in the BEOL. In yet another non-limiting example, the scope of the process technology assessment is assessing the impacts of removing several metal layers in the BEOL.

In a conventional method of process technology assessment, the step 104 proceeds to conventional steps 112, 114, 116, and 118 shown in dash lines to generate technology files 128. Technology files generally provide information on technical requirements during different stages of manufacturing the chip, such as line width, geometry limitation, and placement rule. The generated technology files 128 will subsequently be used in electronic design automation (EDA) tools such as Cadence, Synopsys, and Mentor Graphics at step 132. The conventional steps 112, 114, 116, and 118 are avoided or bypassed in the method 100a, therefore reducing the turn-around-time of the process technology assessment.

Conventionally at step 112, an optical proximity correction (OPC) target is derived. OPC is a photolithography enhancement technique used to compensate for image errors due to diffraction or process effects. Specifically, OPC addresses the fact that the final size and placement of a printed feature on the wafer will not simply be a function of the size and placement of the corresponding feature on the mask. For the small feature sizes and high feature densities present on typical circuit designs, the position of a particular edge of a given feature will be influenced to a certain extent by the presence or absence of other adjacent features. These proximity effects arise from minute amounts of light coupled from one feature to another. Similarly, proximity effects may arise from diffusion and other chemical effects during post-exposure bake (PEB), resist development, and etching that generally follow lithographic exposure. In order to ensure that the features are generated on a semiconductor substrate in accordance with the requirements of the given target circuit design, proximity effects need to be predicted utilizing sophisticated numerical models, and corrections or pre-distortions need to be applied to the design of the mask before successful manufacturing of high-end devices becomes possible. After the conventional step 112, the OPC target is derived.

Conventionally at step 114, an integration target (i.e., a real target) is derived based on the OPC target generated at step 112. Then at conventional step 116, modeling of the integration target is conducted. Then at conventional step 118, RC models are extracted based on the modeling at step 116. In some embodiments, the RC models are extracted to determine parasitic parameters (e.g., parasitic resistance and parasitic capacitance) of interconnects in the layout for timing simulations. Such parasitic parameters are not intended by the circuit designer, but nevertheless occur as a result of configurations and/or materials of the patterns in the layout. After the RC models are extracted at step 118, technology files 128 are generated. The technology files 128 then can be utilized by EDA tools 132 for simulation. In some embodiments, parasitic parameters can be extracted, and the extracted parasitic parameters are subsequently added to a netlist to output a modified netlist. A netlist is a form of a design, specifically a description of the connectivity of an electronic circuit, generated by an analog electronic circuit simulator (e.g., SPICE). A pre-layout simulation is performed on the netlist to determine whether the design meets a predetermined specification. Subsequently, a layout is generated based on the netlist. A layout-versus-schematic (LVS) extraction or check may be performed to ensure that the generated layout corresponds to the design.

After utilizing the technology files 128 by the EDA tools 132 for simulation, data of the simulation are analyzed at step 106. Based on the data analysis, process technology assessment results can be obtained at step 108. For example, the process technology assessment results may provide information on which recipe combination is the best for different process corners of a process flow. A process corner refers to a variation of fabrication parameters used in applying an IC design. Process corners represent the extremes of these parameter variations within which an IC may function appropriately.

However, in the method 100a of FIG. 1A, the method proceeds from step 104 to steps 122, 126 instead by adopting selective resistance-capacitance (RC) scaling techniques. Instead of proceeding to convention step 112, the method 100a proceeds to step 122. At step 122, the scopes and the targets will be analyzed according to their characteristics, and objects (e.g., a feature like a metal track in the BEOL) of an IC are directly modelled into resistance and capacitance domains (i.e., RC modeling). Since objects are directly (i.e., right after defining the scope at step 104) modelled into resistance and capacitance domains, neither physical target, process model, nor real technology file is required at step 122. "Right after" means that step 122 is immediately after step 104, and there is no other step between step 104 and step 122. It should be noted that objects of an IC can be any suitable features of the IC. In one example, the object is a metal track in a metal layer in the BEOL. In another example, the object is a fin structure. In yet another example, the object is a gate structure (i.e., poly). In yet another example, the object is a vertical interconnect access (via) structure. It should be noted that multiple objects of the IC can be directly modelled into resistance and capacitance domains, with different RC scaling factors which will be described in detail below.

In one embodiment, the RC modeling is achieved by some transformation functions. In one non-limiting example, the pitch and width on the first metal layer (M1 layer) have been changed, and the pitch and width changes can be modeled by RC modeling. In another non-limiting example, several metal layers have been added in the BEOL, and the adding of metal layers can be modeled by RC modeling. In yet another non-limiting example, several metal layers have been removed in the BEOL, and the remove of metal layers can also be modeled by RC modeling. The RC modeling can be done by predicting the process technology changes, specifically by comparing the differences between the original process technology and the next process technology.

As mentioned above, the RC modeling may be achieved by some transformation functions. Specifically, the process technology changes are modeled by means of changes in resistance and capacitance of metal or vertical interconnect access (via) structures. Specifically, the changes in resistance and capacitance can be modeled by a series of resistance scaling factors and capacitance scaling factors (collectively RC scaling factors 124), respectively. The modeled resistance R' with process technology changes can be calculated in accordance with the equation below:

$$R' = R \times f_{R_1}(x_1) \times f_{R_2}(x_2) \ldots,$$

where R is the original resistance of the design before any process technology change, $x_i$ is the ith process technology change according to the scope defined at step 104, and $f_{R_i}(x_i)$ is the resistance scaling factor (also called the resistance transformation function) corresponding to the ith process technology change. Similarly, the modeled capacitance C' with process technology changes can be calculated in accordance with the equation below:

$$C' = C \times f_{C_1}(x_1) \times f_{C_2}(x_2) \ldots,$$

Where C is the original capacitance of the design before any process technology change, $x_i$ is the ith process technology change according to the scope defined at step 104, and $f_{C_i}(x_i)$ is the capacitance scaling factor (also called the capacitance transformation function) corresponding to the ith process technology change. As such, the modeled resistance R' and the modeled capacitance C' can be calculated by means of resistance scaling factor(s) and capacitance scaling factor(s), respectively. Accordingly, after step 122, (selective) RC scaling factors 124 can be generated based on the modeling at step 122, the original process technology, and the new process technology.

In one non-limiting example, there are multiple metal layers $\{M_i, M_{i+1}, M_n\}$, and the metal pitches corresponding to the multiple metal layers are $\{P_i, P_{i+1}, \ldots, P_n\}$ while the metal widths corresponding to the multiple metal layers are $\{W_i, W_{i+1}, W_n\}$. After the process technology change, the metal pitches corresponding to the multiple metal layers are reduced to $\{P'_i, P'_{i+1}, \ldots, P'_n\}$ while the metal widths corresponding to the multiple metal layers are reduced to $\{W'_i, W'_{i+1}, \ldots, W'_n\}$. In other words, in the new process technology, the metal pitches are getting smaller, whereas the metal widths are getting smaller as well. As a result, the resistance $R'_{M_i}$ corresponding to the metal layer $M_i$ can be calculated by the equation below:

$$R'_{M_i} = R_{M_i} \times f_{R_1}(M_i) = R_{M_i} \times \frac{W_i}{W'_i},$$

where $R_{M_i}$ is the original resistance corresponding to the metal layer $M_i$, $f_{R_1}(M_i)$ is the resistance scaling factor corresponding to the metal layer $M_i$. The resistance scaling factor is equal to $$\frac{W_i}{W'_i}.$$

In other words, the resistance $R'_{M_i}$ is inversely proportional to the metal width $W'_i$. The smaller the metal width becomes after the process technology change, the larger the resistance becomes. On the other hand, the capacitance $C'_{M_i}$ corresponding to the metal layer $M_i$ can be calculated by the equation below:

$$C'_{M_i} = C_{M_i} \times f_{C_1}(M_i) = C_{M_i} \times \frac{W'_i}{W_i} \times \frac{P_i}{P'_i},$$

where $C_{M_i}$ is the original capacitance corresponding to the metal layer $M_i$, $f_{R_1}(M_i)$ is the capacitance scaling factor corresponding to the metal layer $M_i$. The capacitance scaling factor is equal to $$\frac{W'_i}{W_i} \times \frac{P_i}{P'_i}.$$

In other words, the capacitance $C'_{M_i}$ is proportional to the metal width $W'_i$ and inversely proportional to the metal pitch $P'_i$. The smaller the metal width becomes after the process technology change, the smaller the capacitance becomes (due to a smaller area of a parallel plate capacitor); the smaller the metal pitch becomes after the process technology change, the larger the capacitance becomes larger (due to the fringe effect existing between neighboring metals in the same metal layer). As such, once the metal width reduction and metal pitch reduction for each metal layer is known, the RC scaling factors 124 for each metal layer can be derived accordingly. It should be noted that this is only one non-limiting example of generating RC scaling factors 124 after the RC modeling at step 122, and other RC modeling methods and corresponding RC scaling factors 124 are within the scope of the disclosure. Moreover, the RC scaling factors 124 are selective in some embodiments, meaning that the RC scaling factors 124 are not uniform for the entire process technology change. There may be different RC scaling factors 124 for different features (e.g., different metal layers, different shapes).

Figure 2A:
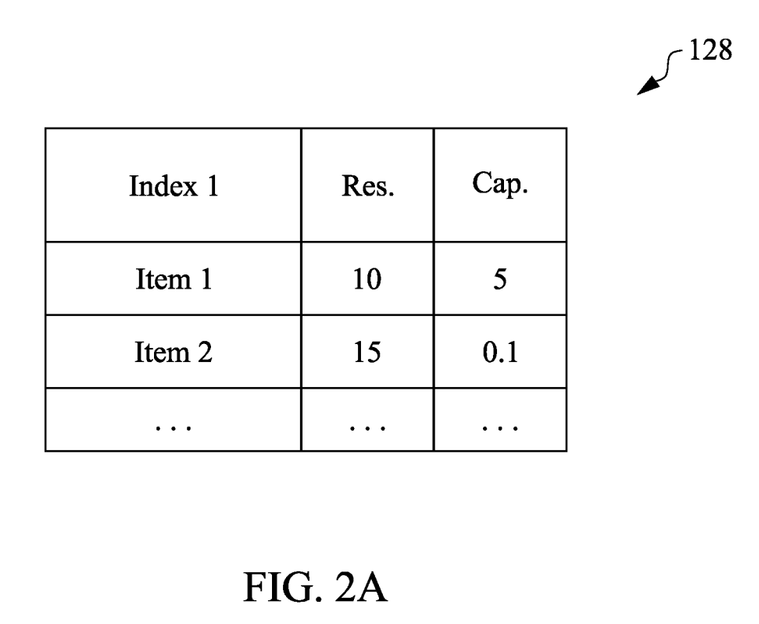
FIG. 2A is a diagram of an example original technology file in accordance with some embodiments.
Figure 2B:
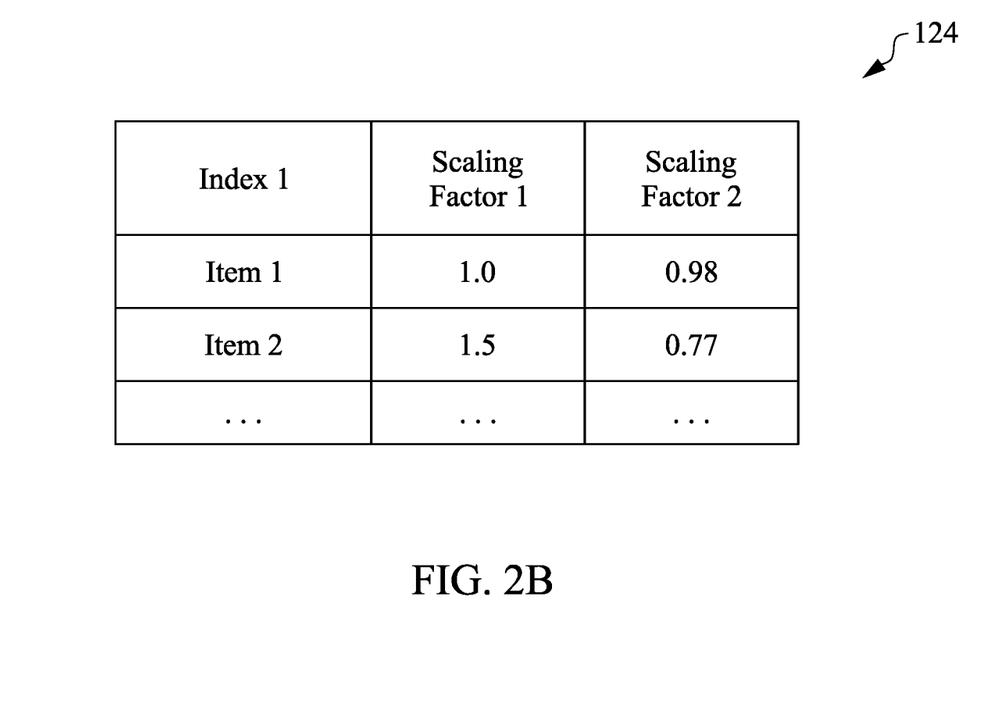
FIG. 2B is a diagram of an example RC scaling factors in accordance with some embodiments.
Figure 2C:
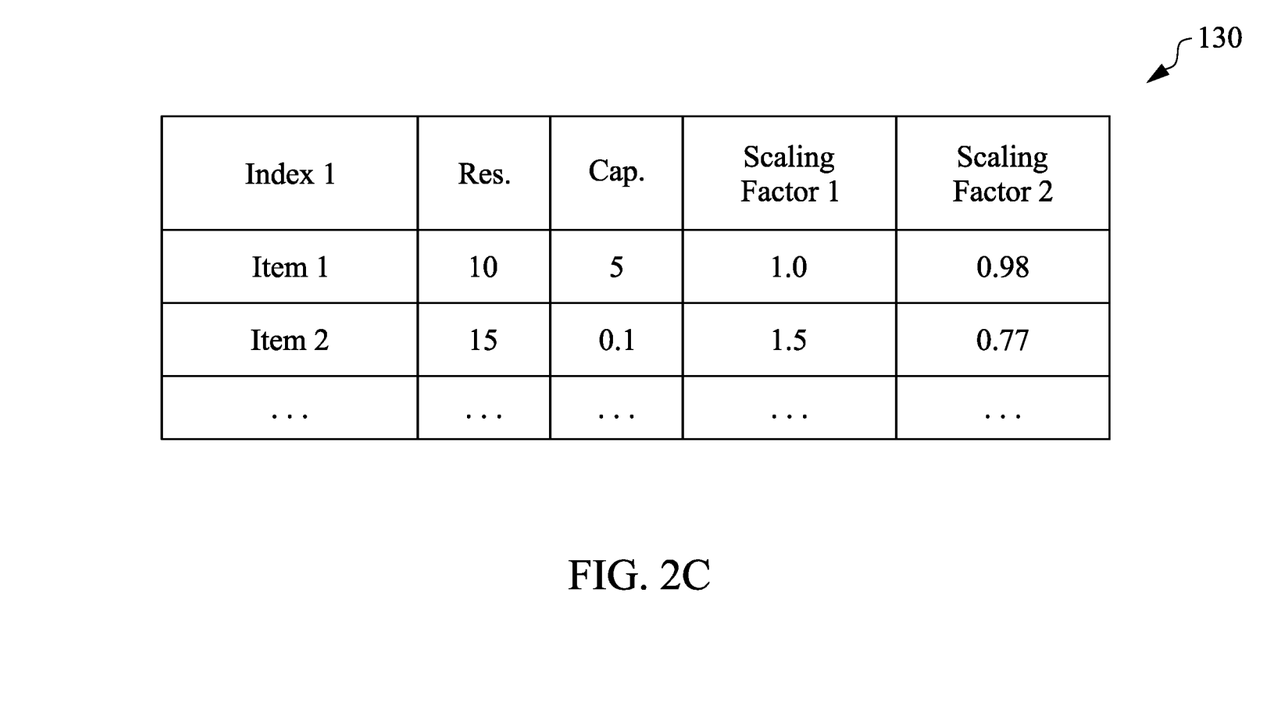
FIG. 2C is a diagram of an example new technology file in accordance with some embodiments.

The method 100a then proceeds to step 126, where the RC scaling factors 124 and the original technology file 128 corresponding to the original process technology are integrated together, to generate the new technology file 130 corresponding to the new process technology. FIG. 2A is a diagram of an example original technology file 128 in accordance with some embodiments. FIG. 2B is a diagram of an example RC scaling factors 124 in accordance with some embodiments. FIG. 2C is a diagram of an example new technology file 130 in accordance with some embodiments. In the example shown in FIG. 2A, the original technology file 128 includes entries for multiple items, each of which includes a resistance parameter and a capacitance parameter. For example, Item 1 includes a resistance parameter (e.g., 10) and a capacitance parameter (e.g., 5); Item 2 includes a resistance parameter (e.g., 15) and a capacitance parameter (e.g., 0.1). In the example shown in FIG. 2B, the RC scaling factors 124 also includes multiple entries for multiple items, each of which includes a scaling factor 1 and a scaling factor 2. The scaling factor 1 is a resistance scaling factor (i.e., R'/R); the scaling factor 2 is a capacitance scaling factor (i.e., C'/C). For example, Item 1 includes a scaling factor 1 (e.g., 1.0) and a scaling factor 2 (e.g., 0.98); Item 2 includes a scaling factor 1 (e.g., 1.5) and a scaling factor 2 (e.g., 0.77). The RC scaling factors 124 for Item 1 and Item 2 are different (i.e., selective). After the integration at step 126, the new technology file 130, in the example shown in 2C, includes entries for multiple items, each of which includes the resistance parameter, the capacitance parameter, the scaling factor 1, and the scaling factor 2. For example, Item 1 includes the resistance parameter (e.g., 10), the capacitance parameter (e.g., 5), the scaling factor 1 (e.g., 1.0), and the scaling factor 2 (e.g., 0.98); Item 2 includes the resistance parameter (e.g., 15), the capacitance parameter (e.g., 0.1), the scaling factor 1 (e.g., 1.5), and the scaling factor 2 (e.g., 0.77).

Referring back to FIG. 1A, the method 100*a* then proceeds to step 132 where the new technology file 130 is utilized by EDA tools for simulation. The EDA tools are capable of processing the RC scaling factors 124 and are therefore compatible with the new technology file 130. The method 100*a* then proceeds to step 106 where data of the simulation are analyzed, as mentioned above. Based on the data analysis at step 106, process technology assessment results can be obtained at step 108, as mentioned above. As such, the method 100*a* can avoid several conventional steps 112, 114, 116, and 118 shown in dash lines, by adopting selective RC scaling techniques. The turn-around-time of the process technology assessment is therefore reduced.

Figure 1B:
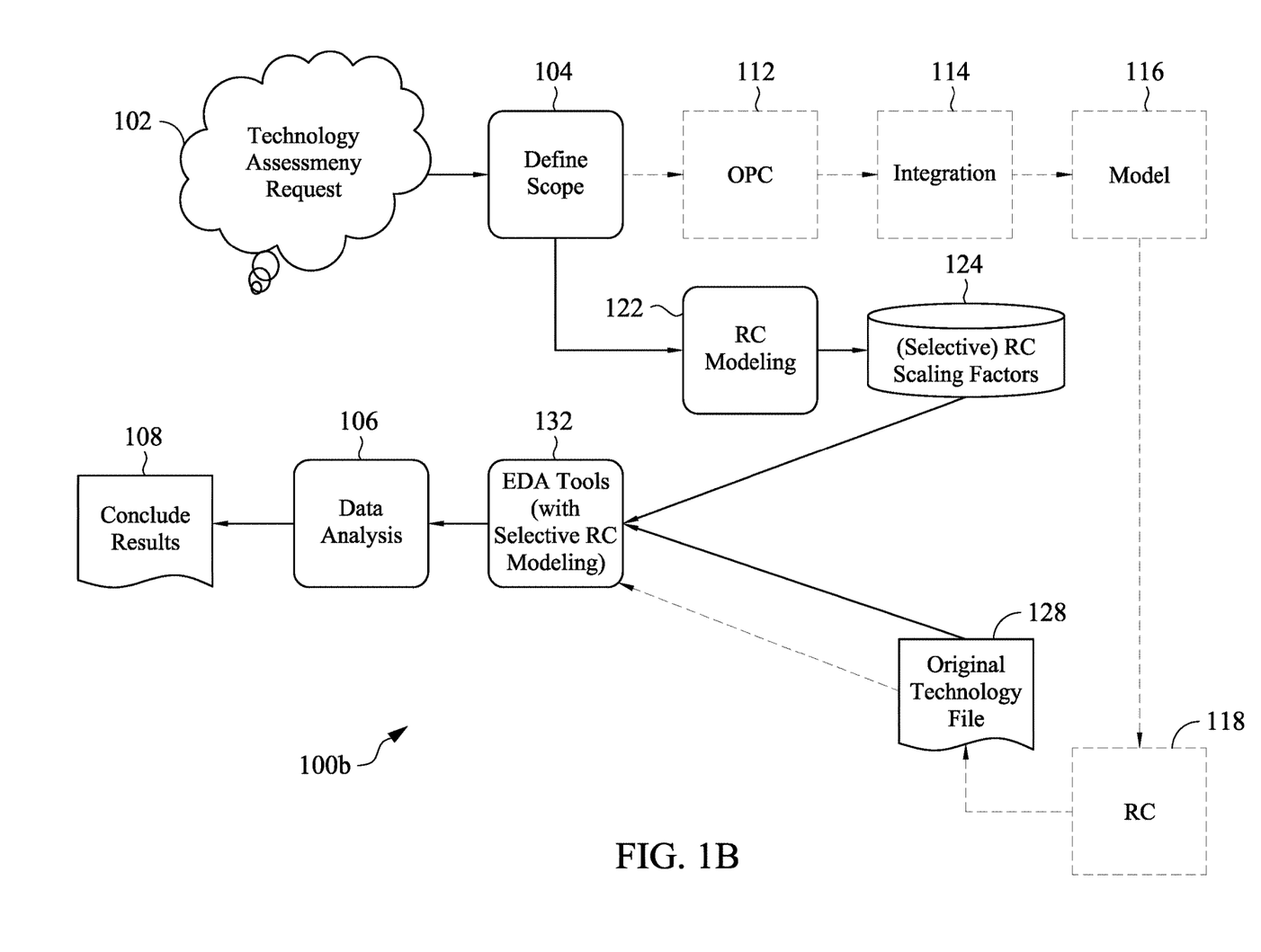
FIG. 1B is a flowchart diagram illustrating a method of fast process technology assessment in accordance with some embodiments.

FIG. 1B is a flowchart diagram illustrating a method 100*b* of fast process technology assessment in accordance with some embodiments. In general, by adopting selective RC scaling techniques, the method 100*b* can avoid several conventional steps 112, 114, 116, and 118 shown in dash lines, therefore reducing the turn-around-time of the process technology assessment. The method 100*b* is similar to the method 100*a* of FIG. 1A, except that the RC scaling factors 124 and the original technology file 128 are not integrated before being utilized by the EDA tools 132. Instead, the RC scaling factors 124 and the original technology file 128 are both inputted into the EDA tools 132. The EDA tools 132 then utilize the RC scaling factors 124 (e.g., including a resistance scaling factor and a capacitance scaling factor) and the original technology file 128 for simulation. In other words, the RC scaling factors 124 are used individually as an auxiliary file in addition to the original technology file 128. Other aspects of the method 100*b* that are identical to those of the method 100*a* of FIG. 1A are not repeated for simplicity. As such, the method 100*b* can avoid several conventional steps 112, 114, 116, and 118 shown in dash lines, by adopting selective RC scaling techniques. The turn-around-time of the process technology assessment is therefore reduced.

Figure 3A:
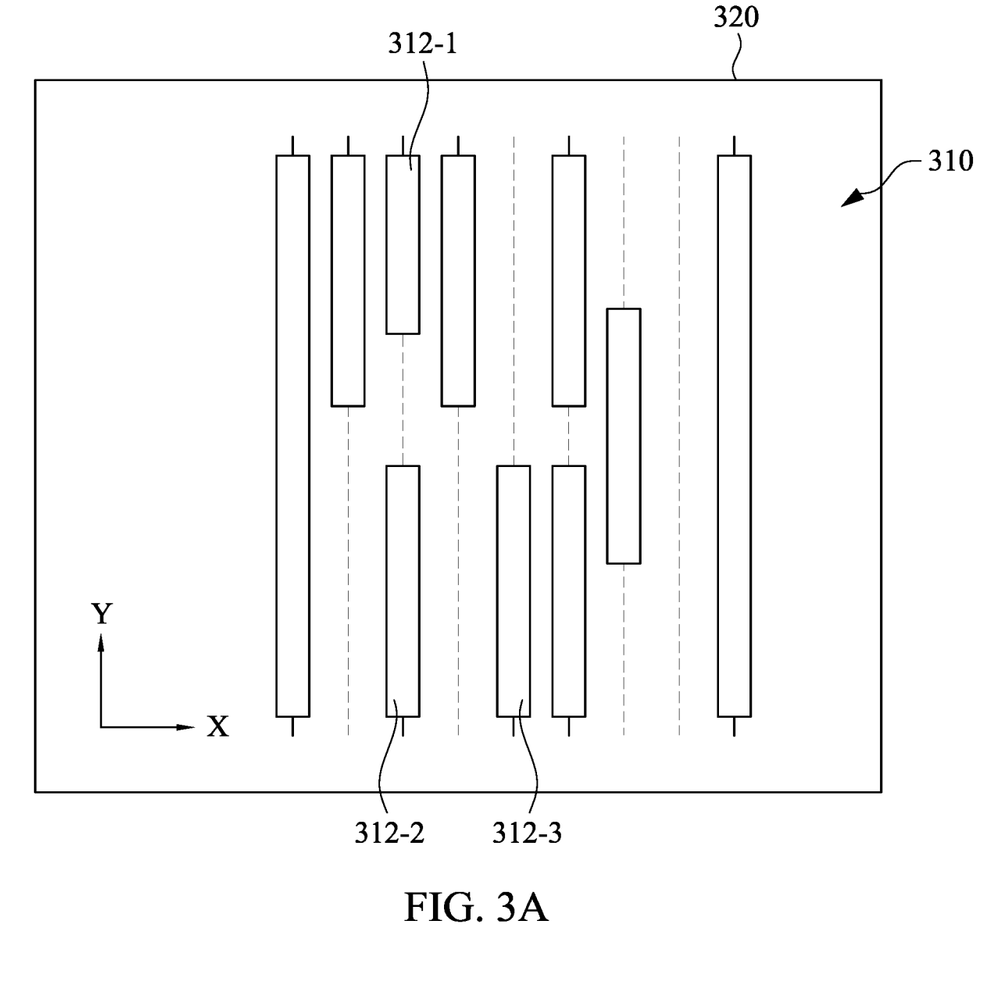
FIG. 3A is a diagram of an example layout to which the method of FIG. 1A is applied in accordance with some embodiments.
Figure 3B:
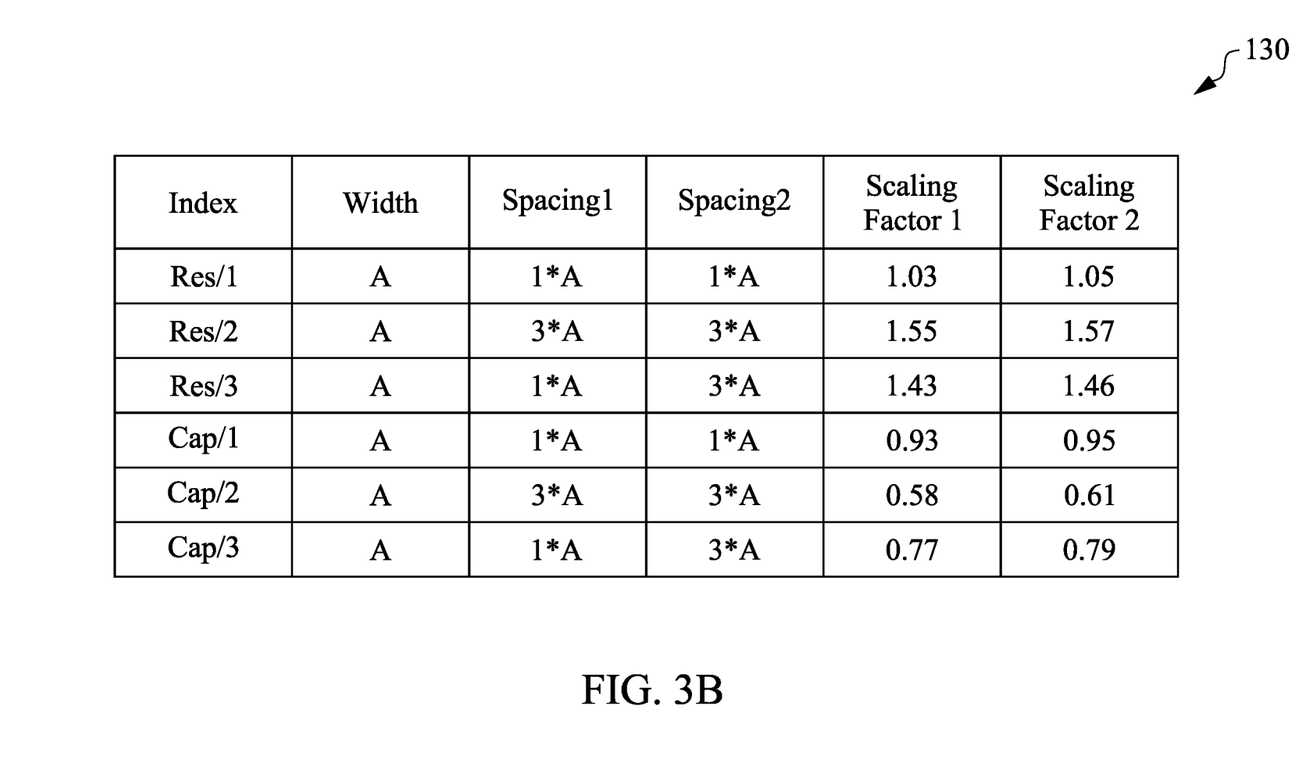
FIG. 3B is a diagram of a new technology file corresponding to the layout of FIG. 3A in accordance with some embodiments.

FIG. 3A is a diagram of an example layout 310 to which the method 100*a* of FIG. 1A is applied in accordance with some embodiments. FIG. 3B is a diagram of a new technology file corresponding to the layout 310 of FIG. 3A in accordance with some embodiments. As mentioned above, (selective) RC scaling factors can be used in EDA tools, and objects of a design under the current process technology can be transformed to objects of a design under the new process technology.

Specifically, as shown in the example of FIG. 3A, a layout 310 includes multiple objects 312 extending in a Y direction. The objects 312 are components of an IC 320. In one example, the objects 312 are metal tracks in the BEOL. In another example, the objects 312 are polygon lines serving as gates of transistors. It should be noted that objects 312 can be other objects such as vertical interconnect access (via) structures. Different objects 312 may have different neighboring conditions. Therefore, different objects 312 may have different RC models and different RC scaling factors. For instance, in the example shown in FIG. 3A, an object 312-1 has a width of A, a spacing to the right neighboring object of A, and a spacing to the left neighboring object of A; an object 312-2 has a width of A, a spacing to the right neighboring object of 3A, and a spacing to the left neighboring object of 3A; an object 312-3 has a width of A, a spacing to the right neighboring object of A, and a spacing to the left neighboring object of 3A. Each object 312 has a resistance model and a capacitance model. The RC scaling factors for each object can be derived from its resistance model and capacitance model by comparing the resistance models and capacitance models under the current process technology and the new process technology. In the example of FIG. 3B, the new technology file 130 corresponding to the layout 310 of FIG. 3A includes two aspects for each object. For instance, the object 312-1 has a resistance aspect (i.e., "Res/1") corresponding to the resistance model and a capacitance aspect (i.e., "Cap/1") corresponding to the capacitance model. For both the resistance aspect and the capacitance aspect, the parameters (in this example, spacing parameters "Width", "Spacing1," and "Spacing2") are the same. The resistance aspect has two scaling factors: the scaling factor 1 (e.g., 1.03) and the scaling factor 2 (e.g., 1.05). The capacitance aspect also has two scaling factors: the scaling factor 1 (e.g., 0.93) and the scaling factor 2 (e.g., 0.95). In other words, the resistance aspect and the capacitance aspect have different scaling factors, though the parameters are the same. The objects 312-2 and 312-3 are similar to the object 312-1.

Figure 4:
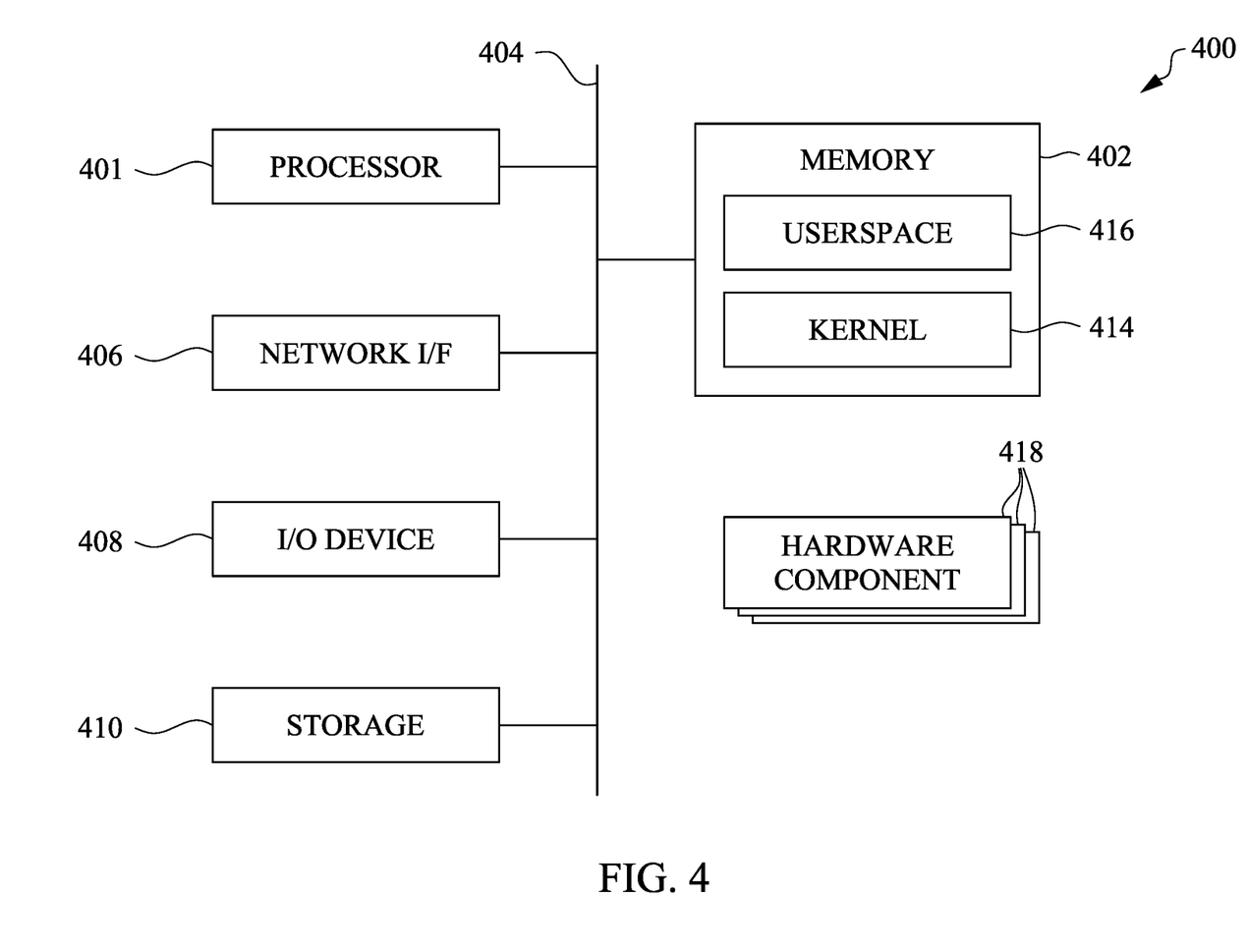
FIG. 4 is a block diagram of a computer system in accordance with some embodiments.

FIG. 4 is a block diagram of a computer system 400 in accordance with some embodiments. One or more of the tools and/or systems and/or operations described with respect to FIGS. 1A-3B are realized in some embodiments by one or more computer systems 400 of FIG. 4. The system 400 comprises a processor 401, a memory 402, a network interface (I/F) 406, a storage 410, an input/output (I/O) device 408, and one or more hardware components 418 communicatively coupled via a bus 404 or other interconnection communication mechanism.

The memory 402 includes, in some embodiments, a random access memory (RAM) and/or other dynamic storage device and/or read only memory (ROM) and/or other static storage device, coupled to the bus 404 for storing data and/or instructions to be executed by the processor 401, e.g., kernel 414, userspace 416, portions of the kernel and/or the userspace, and components thereof. The memory 402 is also used, in some embodiments, for storing temporary variables or other intermediate information during execution of instructions to be executed by the processor 401.

In some embodiments, a storage device 410, such as a magnetic disk or optical disk, is coupled to the bus 404 for storing data and/or instructions, e.g., kernel 414, userspace 416, etc. The I/O device 408 comprises an input device, an output device and/or a combined input/output device for enabling user interaction with the system 400. An input device comprises, for example, a keyboard, keypad, mouse, trackball, trackpad, and/or cursor direction keys for communicating information and commands to the processor 401. An output device comprises, for example, a display, a printer, a voice synthesizer, etc. for communicating information to a user.

In some embodiments, one or more operations and/or functionality of the tool s and/or systems described with respect to FIGS. 1A-3B are realized by the processor 401, which is programmed for performing such operations and/or functionality. One or more of the memory 402, the I/F 406, the storage 410, the I/O device 408, the hardware components 418, and the bus 404 are operable to receive instructions, data, design rules, netlists, layouts, models and/or other parameters for processing by the processor 401.

In some embodiments, one or more of the operations and/or functionality of the tools and/or systems described with respect to FIGS. 1A-3B are implemented by specifically configured hardware (e.g., by one or more application specific integrated circuits or ASIC(s)) which are included) separate from or in lieu of the processor 401. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or other suitable non-transitory computer readable recording medium.

Figure 5:
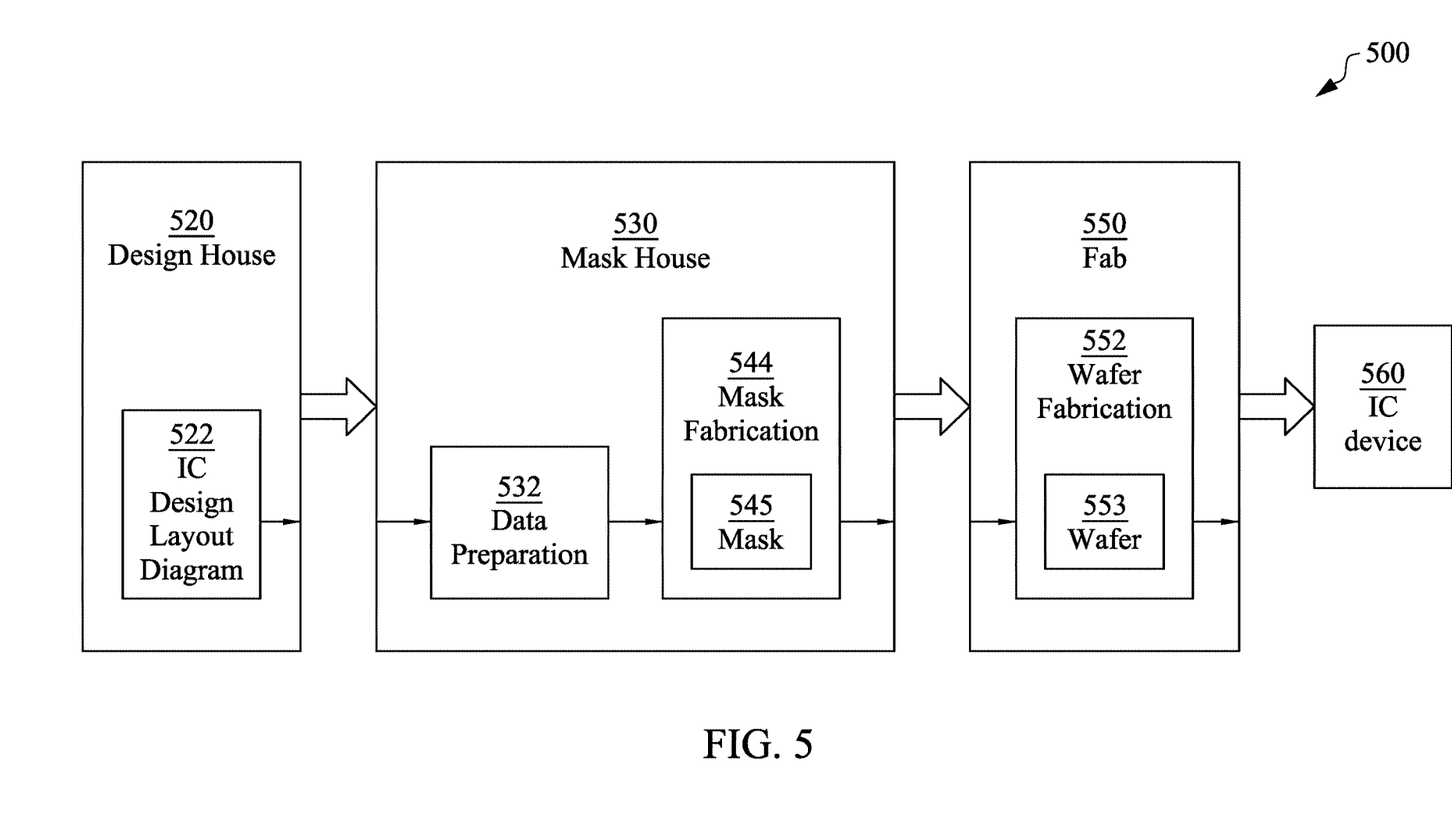
FIG. 5 is a block diagram of IC manufacturing system in accordance with some embodiments.

FIG. 5 is a block diagram of an IC manufacturing system 500 in accordance with some embodiments. In FIG. 5, the IC manufacturing system 500 includes entities, such as a design house 520, a mask house 530, and an IC manufacturer/fabricator ("fab") 550, that interact with one another in the design, development, and manufacturing cycles and/or services related to manufacturing an IC device 560 (e.g., the IC 320 that includes the objects 312-1, 312-2, and 312-3 shown in FIG. 3A). The entities in the system 500 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of the design houses 520, mask house 530, and IC fab 550 is owned by a single larger company. In some embodiments, two or more of design house 520, mask house 530, and IC fab 550 coexist in a common facility and use common resources.

The design house (or design team) 520 generates an IC design layout diagram 522. The IC design layout diagram 522 includes various geometrical patterns, or IC layout diagrams designed for an IC device 560. In one embodiment, the IC design layout diagram 522 corresponds to a new process technology after a process technology assessment as shown in FIG. 1A and FIG. 1B. The geometrical patterns correspond to patterns of metal, oxide, or semiconductor layers that make up the various components of IC device 560 to be fabricated. The various layers combine to form various IC features. For example, a portion of the IC design layout diagram 522 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 520 implements a design procedure to form an IC design layout diagram 522. The design procedure includes one or more of logic design, physical design or place and route. The IC design layout diagram 522 is presented in one or more data files having information of the geometrical patterns. For example, IC design layout diagram 522 can be expressed in a GDSII file format or DFII file format.

The mask house 530 includes a data preparation 532 and a mask fabrication 544. The mask house 530 uses the IC design layout diagram 522 to manufacture one or more masks 545 to be used for fabricating the various layers of the IC device 560 according to the IC design layout diagram 522. The mask house 530 performs mask data preparation 532, where the IC design layout diagram 522 is translated into a representative data file ("RDF"). The mask data preparation 532 provides the RDF to the mask fabrication 544. The mask fabrication 544 includes a mask writer. A mask writer converts the RDF to an image on a substrate, such as a mask (reticle) 545 or a semiconductor wafer 553. The design layout diagram 522 is manipulated by the mask data preparation 532 to comply with particular characteristics of the mask writer and/or requirements of the IC fab 550. In FIG. 5, the mask data preparation 532 and the mask fabrication 544 are illustrated as separate elements. In some embodiments, the mask data preparation 532 and the mask fabrication 544 can be collectively referred to as a mask data preparation.

In some embodiments, the mask data preparation 532 includes a mask rule checker (MRC) that checks the IC design layout diagram 522 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 522 to compensate for limitations during the mask fabrication 544, which may undo part of the modifications performed by OPC in order to meet mask creation rules.

In some embodiments, the mask data preparation 532 includes lithography process checking (LPC) that simulates processing that will be implemented by the IC fab 550 to fabricate the IC device 560. LPC simulates this processing based on the IC design layout diagram 522 to create a simulated manufactured device, such as the IC device 560. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 522.

It should be understood that the above description of mask data preparation 532 has been simplified for the purposes of clarity. In some embodiments, data preparation 532 includes additional features such as a logic operation (LOP) to modify the IC design layout diagram 522 according to manufacturing rules. Additionally, the processes applied to the IC design layout diagram 522 during data preparation 532 may be executed in a variety of different orders.

After the mask data preparation 532 and during the mask fabrication 544, a mask 545 or a group of masks 545 are fabricated based on the modified IC design layout diagram 522. In one embodiment, the mask fabrication 544 corresponds to a new process technology after a process technology assessment as shown in FIG. 1A and FIG. 1B. In some embodiments, the mask fabrication 544 includes performing one or more lithographic exposures based on the IC design layout diagram 522. In some embodiments, an electron-beam (e-beam) or a mechanism of multiple e-beams is used to form a pattern on a mask (photomask or reticle) 545 based on the modified IC design layout diagram 522. The mask 545 can be formed in various technologies. In some embodiments, the mask 545 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of the mask 545 includes a transparent substrate (e.g., fused quartz) and an opaque material (e.g., chromium) coated in the opaque regions of the binary mask. In another example, the mask 545 is formed using a phase shift technology. In a phase shift mask (PSM) version of the mask 545, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 544 is used in a variety of processes. For example, such a mask(s) is used in an ion implantation process to form various doped regions in the semiconductor wafer 553, in an etching process to form various etching regions in the semiconductor wafer 553, and/or in other suitable processes.

The IC fab 550 includes wafer fabrication 552. The IC fab 550 is an IC fabrication business that includes one or more manufacturing facilities for the fabrication of a variety of different IC products. In some embodiments, the IC Fab 550 is a semiconductor foundry. For example, there may be a manufacturing facility for the front end fabrication of a plurality of IC products (FEOL fabrication), while a second manufacturing facility may provide the back end fabrication for the interconnection and packaging of the IC products (BEOL fabrication), and a third manufacturing facility may provide other services for the foundry business.

The IC fab 550 uses mask(s) 545 fabricated by the mask house 530 to fabricate the IC device 560. Thus, the IC fab 550 at least indirectly uses the IC design layout diagram 522 to fabricate the IC device 560. In some embodiments, the semiconductor wafer 553 is fabricated by the IC fab 550 using mask(s) 545 to form the IC device 560. In some embodiments, the IC fabrication includes performing one or more lithographic exposures based at least indirectly on the IC design layout diagram 522. The Semiconductor wafer 553 includes a silicon substrate or other proper substrate having material layers formed thereon. The semiconductor wafer 553 further includes one or more of various doped regions, dielectric features, multilevel interconnects, and the like (formed at subsequent manufacturing steps).

In accordance with some disclosed embodiments, a method of process technology assessment is provided. The method includes: defining a scope of the process technology assessment, the scope comprising an original process technology and a first process technology; modeling a first object in an integrated circuit into a resistance domain and a capacitance domain; generating a first resistance scaling factor and a first capacitance scaling factor based on the modeling, the original process technology, and the first process technology; and utilizing, by an electronic design automation (EDA) tool, the first resistance scaling factor and the first capacitance scaling factor for simulation of the integrated circuit.

In accordance with some disclosed embodiments, a method of generating a new technology file for process technology assessment is provided. The method includes: defining a scope of the process technology assessment, the scope comprising an original process technology and a new process technology; modeling a first object in an integrated circuit into a resistance domain and a capacitance domain; generating a first resistance scaling factor and a first capacitance scaling factor based on the modeling, the original process technology, and the new process technology; and integrating the first resistance scaling factor and the first capacitance scaling factor with an original technology file corresponding to the original process technology, to generate the new technology file.

In accordance with further disclosed embodiments, a system is provided. The system includes: a processor; and a memory accessible by the processor, the memory storing instructions that when executed by the processor execute a method. The method includes: defining a scope of the process technology assessment, the scope comprising an original process technology and a first process technology; modeling a first object in an integrated circuit into a resistance domain and a capacitance domain; generating a first resistance scaling factor and a first capacitance scaling factor based on the modeling, the original process technology, and the first process technology; and utilizing, by an electronic design automation (EDA) tool, the first resistance scaling factor and the first capacitance scaling factor for simulation of the integrated circuit.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of process technology assessment, comprising:
   defining a scope of the process technology assessment by assessing changes between an original process technology that includes original layout parameters and a first process technology that includes first layout parameters;
   modeling a first object in an integrated circuit into a first resistance in the first process technology and a first capacitance in the first process technology;
   generating a first resistance scaling factor that is multiplied by an original resistance in the original process technology to provide the first resistance and a first capacitance scaling factor that is multiplied by an original capacitance in the original process technology to provide the first capacitance;

inputting the first resistance scaling factor and the first capacitance scaling factor into an electronic design automation (EDA) tool;

inputting an original technology file corresponding to the original process technology into the EDA tool; and utilizing, by the EDA tool, the first resistance scaling factor, the first capacitance scaling factor, and the original technology file for the simulation of the integrated circuit.

2. The method of claim 1, wherein the utilizing comprises:

integrating the first resistance scaling factor and the first capacitance scaling factor with the original technology file corresponding to the original process technology to generate a first technology file corresponding to the first process technology; and utilizing, by the EDA tool, the first technology file for the simulation of the integrated circuit.

3. The method of claim 1, further comprising:

receiving a process technology assessment request, wherein the scope is defined based on the process technology assessment request.

4. The method of claim 3, wherein the process technology assessment request is triggered by a design rule change.

5. The method of claim 3, wherein the process technology assessment request is triggered by a metal scheme change.

6. The method of claim 1, further comprising:

analyzing data of the simulation of the integrated circuit; and generating an assessment result.

7. The method of claim 1, wherein the modeling the first object is right after the defining the scope.

8. The method of claim 1, wherein the first object is a metal track in a metal layer.

9. The method of claim 8, wherein the first resistance scaling factor is inversely proportional to a width of the metal track.

10. The method of claim 8, wherein the first capacitance scaling factor is proportional to a width of the metal track and inversely proportional to a pitch of the metal track.

11. The method of claim 1, wherein the first object is a fin structure.

12. The method of claim 1, wherein the first object is a gate structure.

13. The method of claim 1, further comprising:

modeling a second object in the integrated circuit into a second resistance in the first process technology and a second capacitance in the first process technology; and generating a second resistance scaling factor and a second capacitance scaling factor based on the modeling, the original process technology, and the first process technology.

14. The method of claim 13, further comprising:

inputting the second resistance scaling factor and the second capacitance scaling factor into the EDA tool; and utilizing, by the EDA tool, the second resistance scaling factor and the second capacitance scaling factor for the simulation of the integrated circuit.

15. A method of generating a new technology file for process technology assessment, comprising:

defining a scope of the process technology assessment by assessing changes between an original process technology that includes original layout parameters and a new process technology that includes first layout parameters;

modeling a first object in an integrated circuit into a first resistance in the first process technology and a first capacitance in the first process technology;

generating a first resistance scaling factor that is multiplied by an original resistance in the original process technology to provide the first resistance and a first capacitance scaling factor that is multiplied by an original capacitance in the original process technology to provide the first capacitance; and integrating the first resistance scaling factor and the first capacitance scaling factor with an original technology file corresponding to the original process technology to generate the new technology file, wherein the new technology file is utilized by an electronic design automation (EDA) tool for simulation of the integrated circuit.

16. The method of claim 15, further comprising:

receiving a process technology assessment request, wherein the scope is defined based on the process technology assessment request and the process technology assessment request is triggered by at least one of a design rule change and/or a metal scheme change.

17. The method of claim 15, wherein the first object is a metal track in a metal layer, the first resistance scaling factor is inversely proportional to a width of the metal track, and the first capacitance scaling factor is proportional to a width of the metal track and inversely proportional to a pitch of the metal track.

18. A system, comprising:

a processor; and a memory accessible by the processor, the memory storing instructions that when executed by the processor execute a method comprising:

defining a scope of the process technology assessment by assessing changes between an original process technology that includes original layout parameters and a first process technology that includes first layout parameters;

modeling a first object in an integrated circuit into a first resistance in the first process technology and a first capacitance in the first process technology;

generating a first resistance scaling factor that is multiplied by an original resistance in the original process technology to provide the first resistance and a first capacitance scaling factor that is multiplied by an original capacitance in the original process technology to provide the first capacitance;

inputting the first resistance scaling factor and the first capacitance scaling factor into an electronic design automation (EDA) tool;

inputting an original technology file corresponding to the original process technology into the EDA tool; and utilizing, by the EDA tool, the first resistance scaling factor, the first capacitance scaling factor, and the original technology file for the simulation of the integrated circuit.

19. The system of claim 18, wherein the utilizing comprises:

integrating the first resistance scaling factor and the first capacitance scaling factor with the original technology file corresponding to the original process technology to generate a first technology file corresponding to the first process technology; and utilizing, by the EDA tool, the first technology file for the simulation of the integrated circuit.

20. The system of claim 18, further comprising:

modeling a second object in the integrated circuit into a second resistance in the first process technology and a second capacitance in the first process technology;

generating a second resistance scaling factor and a second capacitance scaling factor based on the modeling, the original process technology, and the first process technology;

inputting the second resistance scaling factor and the second capacitance scaling factor into the EDA tool; and utilizing, by the EDA tool, the second resistance scaling factor and the second capacitance scaling factor for the simulation of the integrated circuit.

* * * * *